(12) United States Patent
Labbe et al.

(10) Patent No.: US 9,156,431 B2
(45) Date of Patent: Oct. 13, 2015

(54) STRUCTURAL BODY PILLAR FOR A MOTOR VEHICLE AND MOTOR VEHICLE HAVING A STRUCTURAL BODY PILLAR

(75) Inventors: Klaus Labbe, Undenheim (DE); Juergen Hulbert, Eltville (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 142 days.

(21) Appl. No.: 12/965,668

(22) Filed: Dec. 10, 2010

(65) Prior Publication Data
US 2011/0140481 A1 Jun. 16, 2011

(30) Foreign Application Priority Data
Dec. 11, 2009 (DE) .......... 10 2009 057 943

(51) Int. Cl.
*B62D 25/04* (2006.01)
*B60R 21/34* (2011.01)
*B60R 13/02* (2006.01)

(52) U.S. Cl.
CPC ............. *B60R 21/34* (2013.01); *B62D 25/04* (2013.01); *B60R 13/025* (2013.01); *B60R 2021/343* (2013.01)

(58) Field of Classification Search
CPC ....... B60R 13/02; B60R 13/025; B62D 25/04
USPC ............ 296/30, 187.04, 187.09, 193.06, 201
See application file for complete search history.

(56) References Cited

U.S. PATENT DOCUMENTS

| | | | |
|---|---|---|---|
| 5,575,500 A * | 11/1996 | Mimura et al. | 280/751 |
| 5,810,428 A | 9/1998 | Maki | |
| 5,839,777 A | 11/1998 | Vlahovic | |
| 6,145,921 A | 11/2000 | Cho | |
| 6,305,736 B1 | 10/2001 | Enomoto et al. | |
| 6,340,200 B1 | 1/2002 | Enomoto et al. | |
| 6,340,203 B2 * | 1/2002 | Enomoto et al. | 296/203.02 |
| 6,854,786 B2 | 2/2005 | Berglund et al. | |
| 7,845,713 B2 * | 12/2010 | Terai et al. | 296/193.06 |
| 2001/0002762 A1 | 6/2001 | Enomoto et al. | |

(Continued)

FOREIGN PATENT DOCUMENTS

| | | |
|---|---|---|
| DE | 3718121 A1 | 12/1988 |
| DE | 19519353 A1 | 11/1996 |

(Continued)

OTHER PUBLICATIONS

British Patent Office, British Search Report for British Application No. 1018967.8, dated Mar. 4, 2011.

(Continued)

*Primary Examiner* — Glenn Dayoan
*Assistant Examiner* — Jason S Daniels
(74) *Attorney, Agent, or Firm* — Ingrassia Fisher & Lorenz, P.C.

(57) ABSTRACT

A structural body pillar is provided for a motor vehicle having a structural component. The structural component is designed as closed hollow profile and extends in a longitudinal direction of the structural body pillar. Furthermore, the structural body pillar comprises a facing. The facing comprises an elastic material and is arranged in the direction of an outer side of the motor vehicle above the structural component. The structural component is designed unitarily and on a first side provides a support surface for a window of the motor vehicle.

18 Claims, 1 Drawing Sheet

(56) References Cited

U.S. PATENT DOCUMENTS

| | | |
|---|---|---|
| 2001/0038227 A1 | 11/2001 | Enomoto et al. |
| 2006/0255624 A1* | 11/2006 | Zimmerman et al. ... 296/193.06 |
| 2007/0090668 A1 | 4/2007 | Yoshioka et al. |
| 2007/0210561 A1 | 9/2007 | Yamagiwa et al. |
| 2007/0228700 A1 | 10/2007 | Yamagiwa et al. |

FOREIGN PATENT DOCUMENTS

| | | |
|---|---|---|
| DE | 10055274 A1 | 5/2001 |
| DE | 10059694 A1 | 6/2001 |
| DE | 10121688 A1 | 11/2002 |
| DE | 10350675 A1 | 6/2005 |
| DE | 102004009665 A1 | 9/2005 |
| DE | 102005023263 A1 | 11/2006 |
| DE | 102005049945 A1 | 4/2007 |
| DE | 60214328 T2 | 8/2007 |
| DE | 102007014116 A1 | 9/2008 |
| JP | 2008189095 A | 8/2008 |
| WO | WO 2009001910 A1 * | 12/2008 |

OTHER PUBLICATIONS

German Patent Office, German Search Report for German Application No. 102009057943.5, dated Sep. 7, 2010.

Chinese Patent Office; Office Action dated Jan. 6, 2014 for CN 201010586335.8.

* cited by examiner

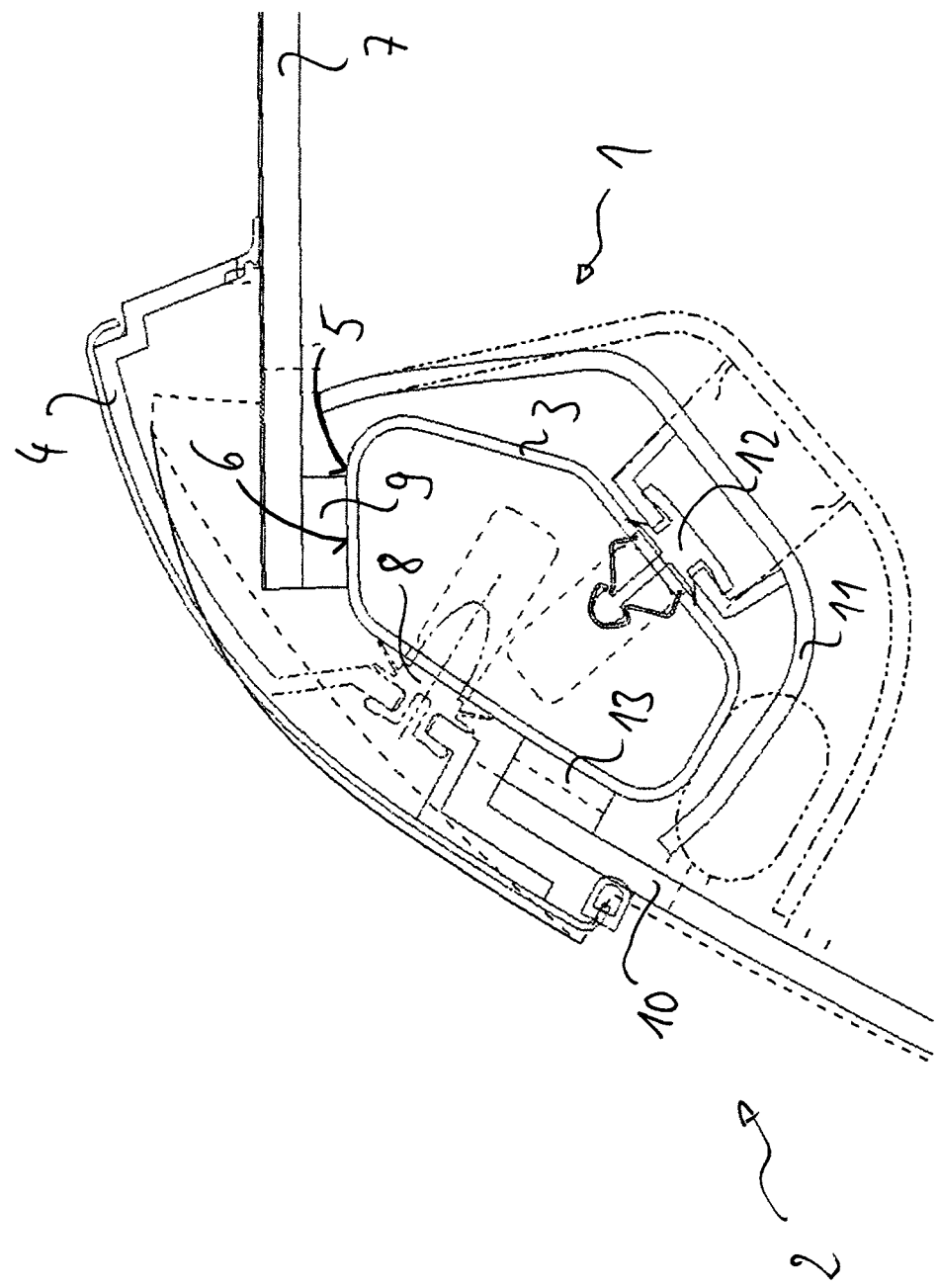

STRUCTURAL BODY PILLAR FOR A MOTOR VEHICLE AND MOTOR VEHICLE HAVING A STRUCTURAL BODY PILLAR

CROSS-REFERENCE TO RELATED APPLICATION

This application claims priority to German Patent Application No. 102009057943.5, filed Dec. 11, 2009, which is incorporated herein by reference in its entirety.

TECHNICAL FIELD

The technical field relates to a structural body pillar for a motor vehicle and motor vehicle having a structural body pillar.

BACKGROUND

In order to minimize injuries in the event of an impact of a person, for example a pedestrian, on a motor vehicle, predetermined regions with known front hood structures are designed in such a manner that these can particularly effectively absorb and reduce the impact energy. Depending on the nature of the impact the person from the engine hood can further strike the front window or an A-pillar.

To satisfy applicable Euro NCAP requirements, particularly the so-called Euro NCAP Head-Impact-Requirements, a so-called minimum "wrap distance" from a stiff body pillar to a softer window region is required. According to the prior art, this includes the configuration of the structure in shell design even including the structural precautions for the window support integrated therein.

From DE 101 21 688 A1 an impact-soft pillar comprising an outer panel and a substructure as well as a mounting with a contact surface on the front end for the marginal region of a windscreen is known. Between the outer panel and the substructure at least one deformation element extending in pillar longitudinal direction is arranged in the region between the mounting and the vehicle door adjoining the pillar or the outer panel in the region between the mounting and the vehicle door is omitted and replaced with a plastic outer part with an integrated deformation element, wherein the plastic outer part contacts the substructure. With the impact-soft pillar the risk of injury can be reduced in the event of an impact of a pedestrian or another person involved in the impact. Disadvantageous in the known pillar is that this is only possible with substantial restriction of the angle of vision of a motor vehicle occupant.

At least one object is to state a structural body pillar for a motor vehicle and a motor vehicle with a structural body pillar which reduces the risk of injury while improving the angle of vision for the vehicle occupants at the same time. In addition, other objects, desirable features and characteristics will become apparent from the subsequent summary and detailed description, and the appended claims, taken in conjunction with the accompanying drawings and this background.

SUMMARY

A structural body pillar is provided for a motor vehicle having a structural component. The structural component is designed as a closed hollow profile and extends in a longitudinal direction of the structural body pillar. In addition, the structural body pillar comprises a facing that comprises an elastic material and in the direction of an outer side of the motor vehicle is arranged above the structural component. The structural component is unitarily designed and provides a support surface for a window of the motor vehicle on a first side of the structural component.

In that the structural component is unitarily designed and provides a support surface for the window of the motor vehicle on the first side, a flange otherwise required for the support of the window can be omitted. This results in a cross section reduction of the structural component. Because of this a hard impact surface of the structural body pillar substantially furnished by the structural component is minimized in an advantageous manner as a result of which the risk of injury is reduced. Thus an improvement during the so-called "Head Impact" can be achieved. Furthermore, the cross section reduction results in a substantial improvement of the angle of vision for the vehicle occupants, in particular for the motor vehicle driver.

In addition, the facing because of its elastic material likewise reduces the risk of injury. In addition, because of the arrangement of the facing relative to the outside of the vehicle, the structural component is covered by the facing and therefore not visible from the outside. Thus the structural component need not necessarily meet the high quality requirements according to the prior art, for example with respect to paintwork. This can be guaranteed through the facing covering the structural component as a result of that adaptation to different configurations is advantageously possible and the number of degrees of freedom for the design of the structural body pillar, for example the visual design, is increased.

In a preferred embodiment of the structural body pillar the first side is a narrow side of the structural component. This makes possible a space-saving arrangement of the window. Preferably the structural body pillar is an A-pillar and the window of a front window of the motor vehicle. Furthermore it is possible that the structural body pillar is a C-pillar or a D-pillar and the window is a rear window of the motor vehicle. In a further configuration of the structural body pillar the elastic material comprises plastic and/or aluminum. Furthermore it is preferred that the facing is paintable.

In a further preferred embodiment the structural component is connected to the facing via at least one fastening element. This advantageously makes possible safe and reliable arrangement of the structural component and the facing. Here, the fastening element can be designed as a clip element.

A motor vehicle is also provided that comprise a structural body pillar according to one of the above-mentioned embodiments. This motor vehicle has the advantages already mentioned in connection with the structural body pillar, which at this point are not mentioned again to avoid repetitions.

In an embodiment, the window is connected to the support surface by means of an adhesive layer. In a further embodiment the window is connected to the support surface by means of a rubber profile. Both embodiments make possible secure connecting of the window to the support surface. Furthermore, the window can be connected to the support surface by means of a first deformation element. Because of this, a further element for absorbing and reducing the impact energy is advantageously provided. The first deformation element can be deformed upon an impact of a person on the window subject to the absorption of impact energy, as a result of which the windscreen is arranged in an impact-soft manner and can also yield in the event of an impact. In a further configuration the facing is connected to the window and to a region of the motor vehicle adjoining the structural body pillar. By means of this, the facing can be reliably fixed on the motor vehicle.

In addition, the structural component can be connected to an interior covering of the structural body pillar and/or to a region of the motor vehicle adjoining the structural body pillar via at least one fastening element each. Because of this, the structural component can be reliably fixed. The respective fastening element can be designed as clip element and/or as gluing element.

In a further embodiment at least one second deformation element is arranged between the facing and the structural component. The second deformation element advantageously makes possible a further reduction of the impact energy, as a result of which the risk of injury for a person involved in an impact can be further reduced. Preferably the second deformation element comprises a foam material. Furthermore, the second deformation element can be designed as sheet metal or plastic element with ribs or honeycomb-like structures. Here, the second deformation element is preferably fastened to the facing and/or the structural component.

BRIEF DESCRIPTION OF THE DRAWINGS

The present invention will hereinafter be described in conjunction with the following drawing FIG. 1 showing a part region of a motor vehicle in cross section.

DETAILED DESCRIPTION

The following detailed description is merely exemplary in nature and is not intended to limit application and uses. Furthermore, there is no intention to be bound by any theory presented in the preceding background or summary or the following detailed description.

In this part region a structural body pillar 1 is arranged. The structural body pillar 1 comprises a structural component 3. Here, the structural component 3 is designed as closed hollow profile and extends in a longitudinal direction of the structural body pillar 1. Here, the longitudinal direction is substantially perpendicular to the drawing plane.

In addition, the structural body pillar 1 comprises a facing. The facing 4 comprises an elastic material and in the direction of an outer side of the motor vehicle 2 is arranged above the structural component 3. Because of this, the structural component 3 is not visible from the outside and therefore does not necessarily fulfill the high quality requirements for example with respect to paintwork. The outer region is covered by the elastic facing 4 in minimum size to satisfy the so-called Head-Impact-Requirements. This results in substantial degrees of freedom with respect to designing the structural body pillar 1.

The structural component 3 is designed unitarily and on a first side 5 of the structural component 3, which in the shown embodiment is a narrow side of the structural component 3, provides a support surface 6 for a window 7 of the motor vehicle 2. The structural body pillar 1 thus comprises a closed profile in the shape of the structural component 3 without additional precaution for the window support. Through the configuration of the structural component 3 as unitary closed hollow profile which is formed on the first side 5 for the window support, an otherwise necessary flange is not required, which results in a cross section reduction of the structural component 3 and altogether of the structural body pillar 1. This brings about a substantial improvement of the angle of vision. In addition, it results in an improvement during the so-called "Head Impact", since the hard impact surface of the structural body pillar 1 is reduced.

In the shown embodiment the window 7 is connected to the support surface 6 of the structural component 3 by means of an adhesive layer 9. It is additionally possible that the window 7 is connected to the support surface 6 of the structural component 3 by means of a rubber profile or at least one deformation element. The structural component 3 continues to be connected to an interior covering 11 of the structural body pillar 1 via at least one fastening element 12. The interior covering 11 is located on the side of the structural body pillar 1 facing the passenger cell. In the embodiment shown the fastening element 12 is designed as clip element. Furthermore it is possible to design the fastening element 12 additionally or alternatively as gluing element. In addition, the structural component 3 is connected to the facing 4 via at least one fastening element 8, which in the shown embodiment is designed as clip element. Furthermore, the structural component 3 is connected to a region 10 of the motor vehicle 2 adjoining the structural body pillar 1 via at least one fastening element 13. The facing 4 is connected to the window 7 and to the region 10 of the motor vehicle 2 adjoining the structural body pillar 1. The elastic material of the facing can for example comprise a plastic and/or aluminum.

In the embodiment shown, the structural body pillar 1 is an A-pillar and the window 7 is a front window of the motor vehicle 2. Therein, the structural component 3 extends in longitudinal direction over the entire A-pillar as far as to a B-pillar of the motor vehicle 2 which is not shown. In addition it is possible that the structural component 3 is a C-pillar or a D-pillar of the motor vehicle 2 and the window 7 is a rear window of the motor vehicle 2.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A structural body for a motor vehicle, comprising:
    a structural body pillar, comprising:
    a structural component designed as a single piece having a closed hollow profile and having no flanges, the structural component adapted to extend in a longitudinal direction of the structural body pillar, the structural component adapted to provide a support surface for a window of the motor vehicle on a first side of the structural component, wherein the first side of the structural component is a narrow side of the structural component;
    a facing comprising an elastic material and arranged in a direction of an outer side of the motor vehicle and above the structural component, wherein the single facing is coupled only to a second side of the structural component and extends from the window to a region of the motor vehicle adjoining the structural body pillar; and
    an interior covering coupled to only a third side of the structural component, the third side of the structural component being substantially opposite from the second side of the structural component.

2. The structural body according to claim 1, wherein the structural body pillar is an A-pillar, and wherein the window is a front window of the motor vehicle.

3. The structural body according to claim 2, wherein the structural body extends over the entire A-pillar.

4. The structural body according to claim 1, wherein the structural body pillar is a C-pillar, and wherein the window is a rear window of the motor vehicle.

5. The structural body according to claim 1, wherein the structural body pillar is a D-pillar, and wherein the window is a rear window of the motor vehicle.

6. The structural body according to claim 1, wherein the elastic material comprises a plastic.

7. The structural body according to claim 1, wherein the elastic material comprises aluminum.

8. The structural body according to claim 1, further comprising a fastening element connecting the structural component to the facing.

9. The structural body according to claim 8, wherein the fastening element is a clip element.

10. The structural body according to claim 1, wherein the first side is not a flange.

11. The structural body according to claim 1, wherein the structural body consists of five faces.

12. A motor vehicle comprising,
a window;
a structural body pillar, comprising:
a structural component designed as a single piece having a closed hollow profile and having no flanges, the structural component adapted to extend in a longitudinal direction of the structural body pillar, the structural component further adapted to provide a support surface for the window of the motor vehicle on a first side of the structural component, wherein the first side of the structural component is a narrow side of the structural component; and
a facing comprising an elastic material and arranged in a direction of an outer side of the motor vehicle and above the structural component, wherein the single facing is coupled only to a second side of the structural component and extends from the window to a region of the motor vehicle adjoining the structural body pillar; and
an interior covering coupled to only a third side of the structural component, the third side of the structural component being substantially opposite from the second side of the structural component.

13. The motor vehicle according to claim 12, further comprising an adhesive layer connecting the window to the support surface.

14. The motor vehicle according to claim 12, wherein the facing is connected to the window and to a region of the motor vehicle adjoining the structural body pillar.

15. The motor vehicle according to claim 12, further comprising a fastening element connecting the structural component to an interior covering of the structural body pillar.

16. The motor vehicle according to claim 15, wherein the fastening element is a clip element.

17. The motor vehicle according to claim 12, further comprising a fastening element connecting the structural component to an interior covering of the structural body pillar to a region of the motor vehicle adjoining the structural body pillar.

18. The motor vehicle according to claim 17, wherein the fastening element is a gluing element.

* * * * *